(12) United States Patent
Edwards et al.

(10) Patent No.: US 6,367,468 B1
(45) Date of Patent: Apr. 9, 2002

(54) BASE PLATE FOR MASONRY TOOL

(76) Inventors: William Edwards, 1289 Forest Ave., San Diego, CA (US) 92008; Marc Rutters, 1896 Aveneda Aragon, Oceanside, CA (US) 92056

(*) Notice: Subject to any disclaimer, the term of this patent is extended or adjusted under 35 U.S.C. 154(b) by 0 days.

(21) Appl. No.: 09/438,188

(22) Filed: Nov. 11, 1999

(51) Int. Cl.[7] .................................................. B28D 5/04
(52) U.S. Cl. .............................. 125/36; 30/374; 125/1; 125/13.01
(58) Field of Search ......................... 30/276, 373, 374, 30/375, 376, 377; 125/1, 12, 13.01, 36, 38

(56) References Cited

U.S. PATENT DOCUMENTS

| | | | |
|---|---|---|---|
| 2,676,624 A | * | 4/1954 | Gecman ........................ 30/373 |
| 4,251,174 A | | 2/1981 | Satler |
| 4,334,356 A | * | 6/1982 | Krosunger ..................... 30/374 |
| 4,915,550 A | | 4/1990 | Arai |
| 4,938,201 A | * | 7/1990 | Chiuminatta et al. ..... 125/38 X |
| 5,240,359 A | | 8/1993 | Backhouse |
| 5,784,789 A | | 7/1998 | Vargas |

FOREIGN PATENT DOCUMENTS

DE          3404555          8/1985

* cited by examiner

Primary Examiner—Timothy V. Eley
(74) Attorney, Agent, or Firm—D. Whitlow Bivens

(57) ABSTRACT

A baseplate for a masonry tool having a support member with a passageway therein which has an inlet for receiving fluid and at least one outlet for directing fluid underneath the support member and rotating means attached to the bottom of the support member. The invention reduces the chances of scratching the surface of the substrate upon which work is being performed while allowing easy movement of the tool under all circumstances.

18 Claims, 3 Drawing Sheets

BASE PLATE FOR MASONRY TOOL

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION i. Field of the Invention

The present invention relates to baseplates for masonry tools. More specifically, the present invention relates to a novel baseplate for masonry routers, milling machines, saws and polishing tools. These tools are used to work and finish all types of masonry and stone including, for example, marble and granite. Masonry routers or milling machines are commonly used, for example, to carve a particular edge design in a counter top. Masonry saws are used to cut masonry. Masonry polishing tools are used to finish and polish, for example, counter top edges. The baseplate of such tools is the portion of the tool that contacts the masonry or substrate upon which work is being done, excluding the blade or wheel of the tool.

ii. Description of Related Art

Masonry tools have been known in the art for a considerable time. Generally, such tools are quite heavy (for example, approximately sixty pounds) and are difficult to move across a masonry surface.

In prior art masonry tools, one approach taken to minimize this problem is to place ball casters in the baseplate of the masonry tool. For example, until recently, at least one manufacturer of masonry routers used nylon balls positioned in the support member. These balls roll across the surface of the substrate easing movement of the router. One disadvantage of this approach is that masonry fragments and dust are impressed into the ball and/or caught in the ball socket. These fragments or dust then jam the ball and prevent the ball from rolling smoothly. The fragments and dust may also become caught between the ball and the substrate surface. In such a situation, movement of the baseplate may result in the surface of the substrate being scratched. This is especially disadvantageous when working with a substrate which has a surface that is finished and polished.

One approach the prior art has taken to minimize the problems associated with the ball casters described above is to eliminate the ball casters and have a cushion of water produced under the baseplate. Pursuant to this approach, water is expelled from the baseplate and the baseplate of the tool floats across the substrate surface on the cushion of water without the use of ball casters. While this approach avoids the jamming and scratching problems described above, it does not always result in easy movement across the substrate surface. This problem is particularly pronounced when the masonry tool approaches a corner of the substrate. In such a situation, the cushion of water deteriorates and the router no longer floats across the substrate surface. Rather, the router must be dragged along with its baseplate resting directly on the substrate. This presents scratching problems and results in the router being difficult to move. The difficulty of movement is particularly problematic because it frequently occurs at a corner which often requires more attention to detail than a straight edge.

U.S. Pat. No. 5,784,789 ("Vargas") discloses a rotary trim saw for cutting materials in difficult to reach places. Vargas teaches that the trim saw may have a base having ball caster type wheels.

German Patent Document No. DE 3,404,555 (The "German Disclosure") discloses an apparatus for machining a stack of metal sheets. The German Disclosure teaches that the stack of metal sheets may be held against each other and against the work table surface by hydrostatic pressure. The machine blade is surrounded by a ring with multiple nozzles. Pressurized fluid is pumped from the nozzles such that there is a clearance between the underside of the ring and the top metal sheet. The German Disclosure teaches that by holding the sheets in position in this manner, the top sheet is not damaged in the machining process.

SUMMARY OF THE INVENTION

The present invention relates to a baseplate for masonry tools that will move smoothly across a work surface under all circumstances without scratching the work surface. The invention includes a support member for moving a masonry tool over a work surface. The support member has a passageway therein with an inlet for receiving fluid and a plurality of outlets for directing fluid underneath the support member. A plurality of rotating members are mounted to the bottom of the support member for allowing the support member to move relative to the work surface. The direction of fluid underneath the support member assists in the movement of the support member relative to the work surface. Thus, the rotating members and the fluid underneath the support member cooperate to facilitate the movement of the support member relative to the work surface.

In one embodiment of the invention, the rotating members are main rotating balls mounted within sockets on the underside of the baseplate. In another embodiment, the sockets are continuously flushed with fluid which continuously cleans the sockets of debris, preventing the main rotating balls from jamming and minimizing the chances of scratching the substrate. Ball bearings may be included to facilitate the rotation of the main rotating balls. In another embodiment of the invention, the main rotating balls are combined with fluid outlets in the underside of the baseplate that produce a cushion of fluid upon which the masonry tool floats. In another embodiment, the prior two embodiments are combined; fluid outlets are positioned on the underside of the baseplate and fluid outlets are positioned in the ball sockets which are continuously flushed as described above.

In operation, the outlets directing fluid underneath the baseplate of the invention produce a cushion of fluid. Pressurized water may be used as the fluid. Much, if not all, of the weight of the masonry tool is borne by the cushion of fluid underneath the support member when the fluid cushion is present. When the fluid cushion substantially deteriorates, such as when the tool approaches a corner, much, if not all of the weight of the masonry tool is borne by the rotating members. In one embodiment these rotating members are main rotating balls located within recesses in the support member. In another embodiment, the fluid outlets are positioned within the recesses to continuously expel fluid into the recesses holding the main rotating balls. This expelled fluid continuously flushes the recesses minimizing the chance of debris being caught in the recess and/or the main rotating ball and scratching the surface of the substrate.

DETAILED DESCRIPTION OF THE PREFERRED EMBODIMENTS

The following description is of the best presently contemplated modes of carrying out the invention. This description is made for the purpose of illustrating the general principles of the invention and should not be taken in a limiting sense.

The figures and following example use the baseplate for a masonry router as an example of the invention. The use of a router baseplate to illustrate the invention should not be construed to limit the scope of the invention to only masonry routers, as one skilled in the art will appreciate that the principals illustrated here are equally applicable to many different types of masonry tools.

Figure 1:
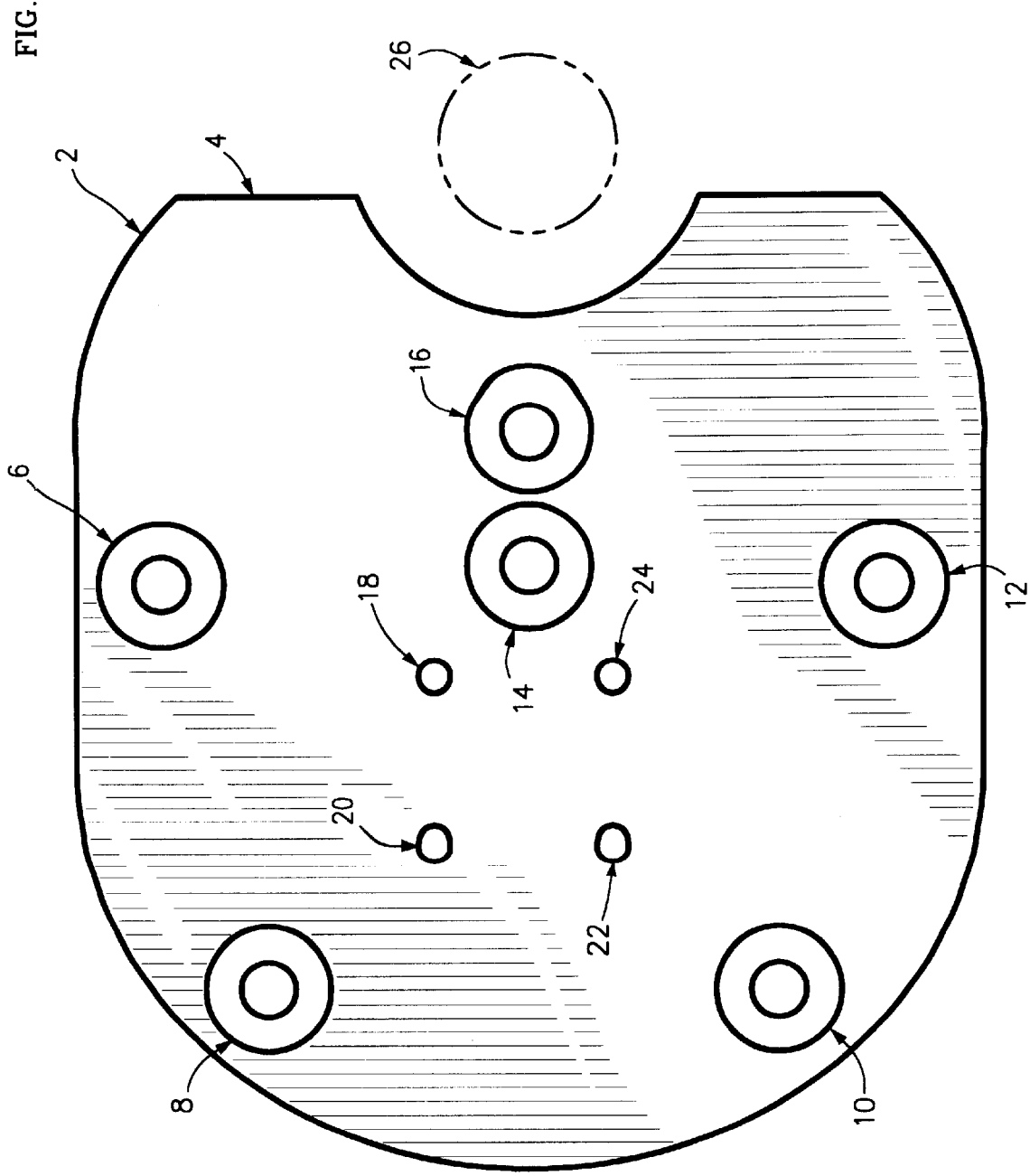
FIG. 1 is a plan view of the bottom of a baseplate in accordance with the principles of the invention.

In accordance with the invention, there is shown in FIG. 1 the bottom surface of a router baseplate generally designated as 2 having a support member 4 which contains main rotating balls 6, 8, 10, 12, 14 and 16. Water outlets 18, 20, 22 and 24 are positioned on the bottom surface of support member 4. The router blade location is designated 26. The positioning of main rotating balls 8, 10 and 14 in a triangular fashion as shown allows the router to make particularly tight corners.

In operation, pressurized water is expelled from water outlets 18, 20, 22 and 24. Water is also expelled around the main rotating balls. This water forms a cushion of water upon which the router floats when machining a relatively straight edge. In some cases, however, the cushion of water deteriorates. Such deterioration has been observed when the router approaches a corner of the substrate. When the water cushion deteriorates, the router rests on the main rotating balls 6, 8, 10, 12, 14 and 16. These balls and the sockets in which they are contained are continually flushed with pressurized water to minimize the potential for debris becoming stuck in the sockets and the substrate being scratched.

Figure 2:
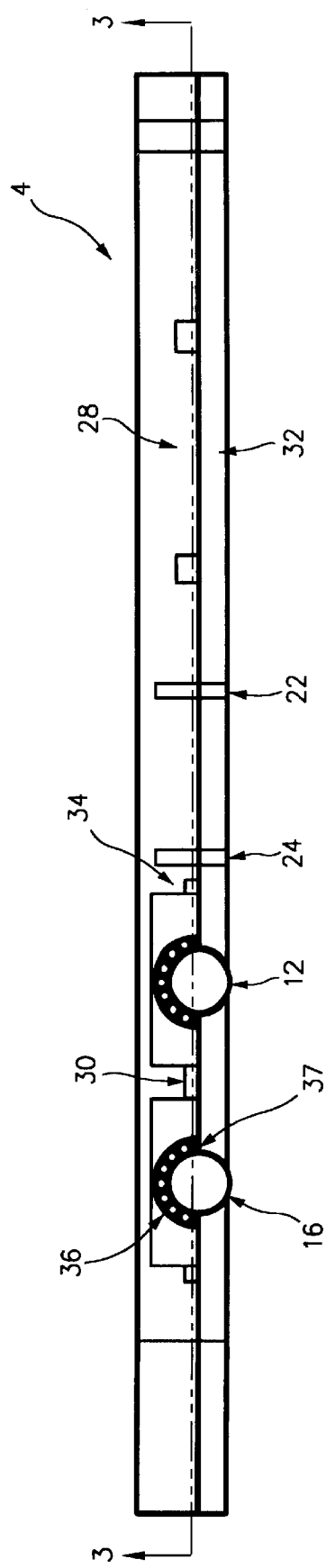
FIG. 2 is a side view of the baseplate in accordance with the principles of the invention.

FIG. 2 shows a side view of the support member 4 in accordance with the invention. The support member 4 is composed of two layers. The first layer 28 is composed of aluminum and has the passageway designated generally as 30 therein. The second layer 32 is composed of delrin. The material containing the main rotating balls (designated generally as 34, balls 12 and 16 are labeled as examples) and ball bearings (designated generally as 36) is stainless steel. The recesses containing the main rotating balls and ball bearings is designated generally as 37. Water outlets 24 and 22 are labeled as examples. In operation, pressurized water is supplied to the inlet (labeled 38 in FIG. 3), passes through the passageway 30 and is expelled into the recesses (designated generally as 37) and out the water outlets 22 and 24 in the bottom surface of the support member (outlets 18, 20, 22 and 24 are shown in FIG. 1). The water that is expelled through the recesses continuously flushes the recesses, the ball bearings and the main rotating ball, minimizing the potential for the scratching of the surface of the substrate.

Figure 3:
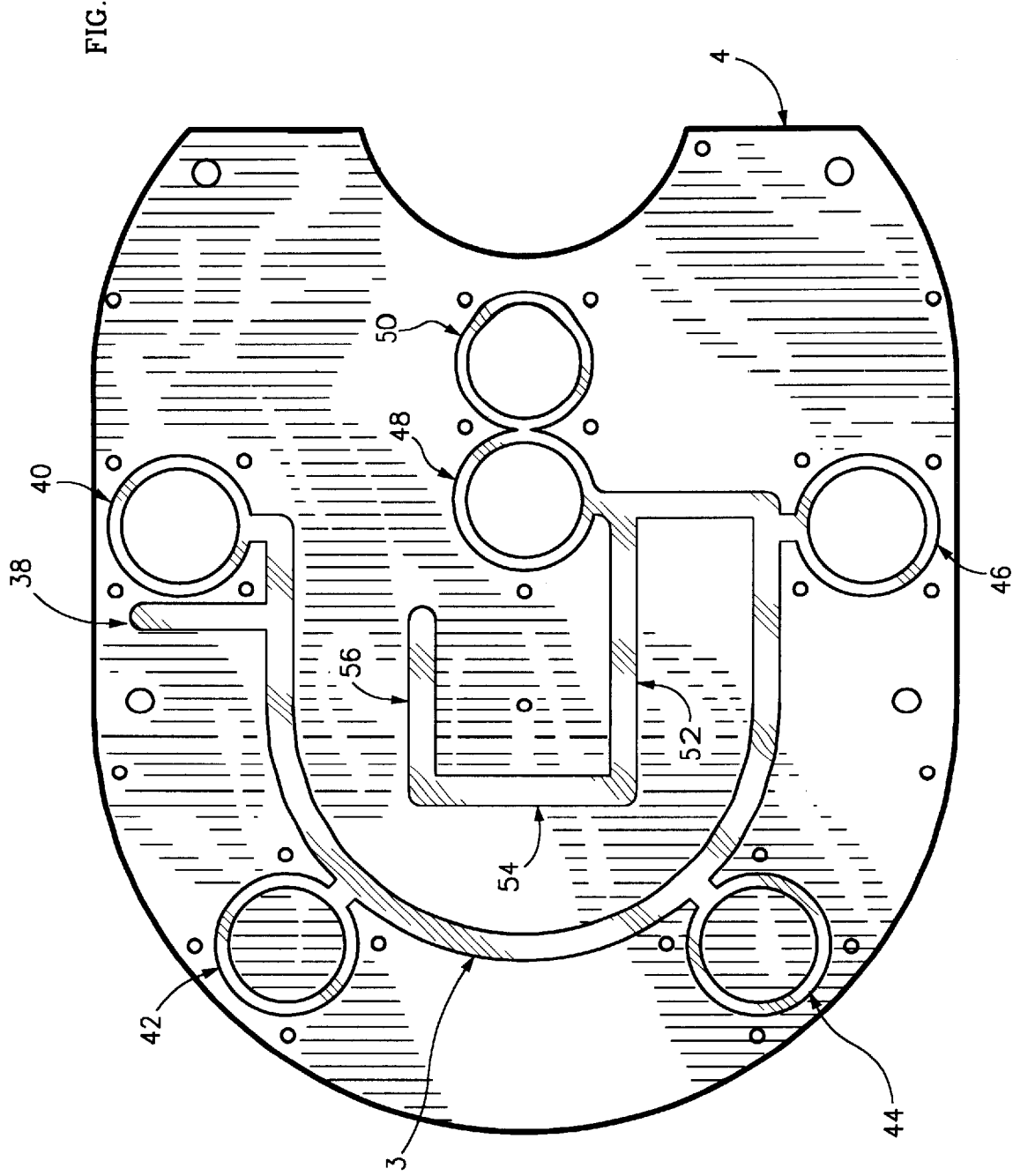
FIG. 3 is a cross sectional view of the baseplate taken along line 2—2 of FIG. 2.

FIG. 3 shows a cross sectional view of the support member 4 illustrating one example of the passageway designated generally as 30. The passageway has an inlet 38, a plurality of outlets 40, 42, 44, 46, 48 and 50 located within the recesses that contain the rotating balls and ball bearings (shown in FIG. 2 designated generally as 37). The portions of the passageway designated generally as 52, 54 and 56 connect with the water outlets 18, 20, 22 and 24 (shown in FIG. 1). In operation, pressurized water is supplied to the inlet 38, travels through the passageway 30 and is expelled through the water outlets 18, 20, 22 and 24 (shown in FIG. 1) and the outlets 40, 42, 44, 46, 48 and 50 positioned within the recesses that contain the rotating balls and ball bearings (shown in FIG. 3 designated generally as 37).

It will be appreciated that a variety of materials may be used to make up the various portions of the invention.

Although the present invention has been described in terms of certain preferred embodiments and exemplified with respect thereto, one skilled in the art will readily appreciate that various modifications, changes, omissions and substitutions may be made without departing from the spirit and scope of the present invention. It is intended that the present invention be limited solely by the scope of the following claims:

What is claimed is:

1. A baseplate for a masonry tool comprising:
   a support member for moving said masonry tool over a work surface;
   said support member having a passageway therein with an inlet for receiving fluid and at least one outlet for directing fluid underneath the support member to assist the movement of said support member relative to said work surface; and
   rotating means mounted to the bottom of said support member for allowing said support member to move relative to said work surface.

2. A baseplate for a masonry tool according to claim 1 wherein said rotating means comprises:
   at least two main rotating balls; and
   said support member has at least two recesses in the bottom thereof, each recess for rotatably receiving a rotating ball.

3. A baseplate for a masonry tool according to claim 2 wherein at least one recess has an outlet positioned therein for flushing said recess with fluid.

4. A baseplate for a masonry tool according to claim 2 wherein at least one outlet is positioned on the bottom surface of said support member.

5. A baseplate for a masonry tool according to claim 2 wherein at least one recess has an outlet positioned therein for flushing said recess with fluid, and at least one outlet is positioned on the bottom surface of said support member.

6. A baseplate for a masonry tool according to claims 1, 2, 3, 4 or 5 wherein said inlet is supplied with pressurized water.

7. A baseplate for a masonry tool according to claim 2 wherein said rotating means further comprises:
   a plurality of ball bearings located within one or more of said recesses to facilitate the rotation of at least one of said at least two main rotating balls.

8. A baseplate for a masonry tool according to claim 7 wherein at least one recess has an outlet positioned therein for flushing said recess with fluid.

9. A baseplate for a masonry tool according to claim 7 wherein at least one outlet is positioned on the bottom surface of said support member.

10. A baseplate for a masonry tool according to claim 7 wherein at least one recess has an outlet positioned therein for flushing said recesses with fluid, and at least one outlet is positioned on the bottom surface of said support member.

11. A baseplate for a masonry tool according to claims 7, 8, 9 or 10 wherein said inlet is supplied with pressurized water.

12. A baseplate for a masonry tool according to claim 1 wherein at least one outlet is positioned on the bottom surface of said support member.

13. A baseplate for a masonry tool according to claim 1 wherein said at least one outlet is further positioned to direct fluid across the surface of said rotating means.

14. A baseplate for a masonry tool according to claim 1 wherein at least one outlet is positioned on the bottom surface of said support member and at least one outlet is positioned to direct fluid across the surface of said rotating means.

15. A baseplate for a masonry tool according to claims 12, 13 or 14 wherein said inlet is supplied with pressurized water.

16. A baseplate for a masonry tool according to claims 1, 2, 3, 4, 5, 7, 8, 9, 10, 12, 13 or 14 wherein said masonry tool is a masonry router.

17. A baseplate for a masonry tool according to claims 1, 2, 3, 4, 5, 7, 8, 9, 10, 12, 13 or 14 wherein said masonry tool is a masonry saw.

18. A baseplate for a masonry tool according to claims 1, 2, 3, 4, 5, 7, 8, 9, 10, 12, 13 or 14 wherein said masonry tool is a masonry milling machine.

* * * * *